United States Patent [19]
White

[11] 3,837,042
[45] Sept. 24, 1974

[54] PIVOTS

[75] Inventor: William Paul White, Ellesboro Port, England

[73] Assignee: United Kingdom Atomic Authority, London, England

[22] Filed: Mar. 16, 1973

[21] Appl. No.: 342,790

Related U.S. Application Data

[63] Continuation of Ser. No. 124.263. Mar. 15. 1971. abandoned.

[30] Foreign Application Priority Data
Mar. 26, 1970 Great Britain.................... 14941/70

[52] U.S. Cl......................... 16/140, 308/238, 85/83
[51] Int. Cl............................................ E05d 11/08
[58] Field of Search ................ 16/140, 136; 260/67; 308/238; 85/75, 83; 151/32

[56] References Cited
UNITED STATES PATENTS

| | | | |
|---|---|---|---|
| 1,052,830 | 2/1913 | Kennedy | 85/83 |
| 1,193,636 | 8/1916 | Van Antwerp | 85/75 |
| 1,847,937 | 3/1932 | Fetters | 16/140 |
| 2,479,075 | 8/1949 | Martin | 151/32 |
| 2,607,949 | 8/1952 | Lyon | 16/140 |
| 2,698,958 | 1/1955 | Adams | 16/140 |
| 3,067,173 | 12/1962 | Barney | 260/67 X |
| 3,125,004 | 3/1964 | White | 308/238 |
| 3,239,874 | 3/1966 | Sperzel | 16/140 |
| 3,474,470 | 10/1969 | Watson | 16/140 X |
| 3,499,183 | 3/1970 | Parsons | 16/136 |

FOREIGN PATENTS OR APPLICATIONS

| | | | |
|---|---|---|---|
| 640,486 | 1/1937 | Germany | 16/140 |
| 465,626 | 5/1937 | Great Britain | 16/140 |
| 1,175,029 | 11/1958 | France | 16/140 |

Primary Examiner—Paul R. Gilliam
Assistant Examiner—Peter A. Aschenbrenner
Attorney, Agent, or Firm—Larson, Taylor & Hinds

[57] ABSTRACT

A window or door pivot in which a first bearing member has a bearing surface which is in frictional engagement with a bearing surface of a second bearing member, the bearing surfaces being of materials between which the static friction is low and is similar to the dynamic friction, means being provided for generating and maintaining a high interfacial pressure between the bearing members.

Suitable materials for the bearing surfaces are for example chromium plating, brass or stainless steel for one of the bearing surfaces and an acetal polymer for the other of the bearing surface.

10 Claims, 6 Drawing Figures

PATENTED SEP 24 1974　　3,837,042

PIVOTS

This is a continuation of application Ser. No. 124,263 filed Mar. 15, 1971, now abandoned.

BACKGROUND OF THE INVENTION

This invention relates to frictionally adjustable pivot bearing assemblies.

The building construction industry uses pivot type windows and doors having pivots which normally incorporate frictionally adjustable bearing assemblies. Such frictionally adjustable pivot bearing assemblies allow a pivot type window or door to be opened to a required position but provide sufficient friction to maintain the window or door in the open position despite forces due to gravity and to variations in the dimensional stability of their frames, until moved to another position or closed.

Existing designs of pivots incorporating frictionally adjustable bearings satisfy the above requirements by the use of material having a relatively high coefficient of friction between cooperating bearing surfaces with relatively low interfacial pressure applied between the bearing surfaces. The interfacial pressure applied between the bearing surfaces is adjusted to provide a given torque which will hold the window or door in an open position. Unfortunately, such designs are subject to several disadvantages, for example, a stick-slip phenomenon may occur at the bearing surfaces, leading to poor control of the friction adjustment. Also during use relaxation of the interfacial pressure acting between the bearing surfaces can occur with a consequent loss in holding power of the pivots. In addition the bearings can be noisy in operation.

It is an object of the invention to provide a pivot incorporating an improved frictionally adjustable bearing assembly.

SUMMARY OF THE INVENTION

According to the invention a pivot bearing assembly comprises a first bearing member having a bearing surface which is in frictional engagement with a bearing surface of a second bearing member, the bearing surfaces of the first and second bearing members being of materials between which the static friction is low and is similar to the dynamic friction, means being provided for generating and maintaining a high interfacial pressure between the bearing surfaces of the bearing members.

The bearing surface of one of the bearing members may be of metal and the bearing surface of the other of the bearing members may be of plastic.

For example materials between which the static friction is low and similar to the dynamic friction are chromium plating, brass or stainless steel for one of the bearing surfaces and an acetal polymer for the other bearing surface.

One of the bearing members may be a shaft having an end fitted in the other bearing member which is in the form of a drum the shaft having an external cylindrical bearing surface which is in frictional engagement with a complementary cylindrical bearing surface in the drum, adjustable means being provided for radially expanding the end of the shaft in the drum to generate and maintain a high interfacial pressure between the bearing surface on the shaft and the bearing surface in the drum.

The means for radially expanding the end of the shaft inside the drum may comprise a conically tapered plug member fitting in a conically tapered longitudinal bore in the shaft, screw adjusting means being provided for forcing the plug member along the bore of the shaft to radially expand the end of the shaft in the drum.

In a preferred embodiment the shaft is of an acetal polymer and the bearing surface inside the drum is chromium plated or is fitted with a lining sleeve of brass or stainless steel. The conically tapered plug member may have a threaded extension engaging with a threaded part of the longitudinal bore in the shaft.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
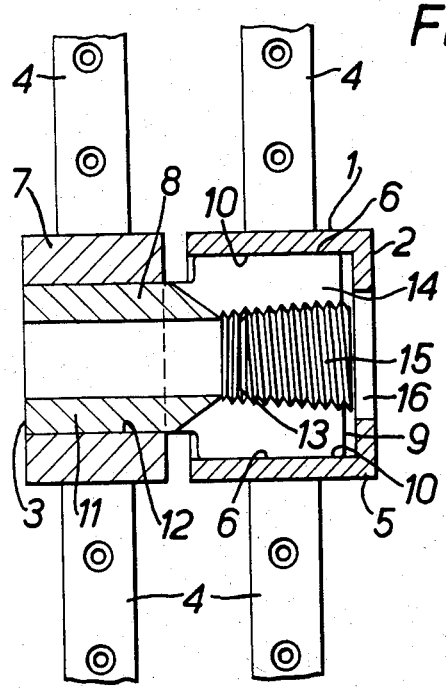
FIG. 1 is a sectional view of a window pivot incorporating a frictionally adjustable bearing assembly according to the invention.
Figure 2:
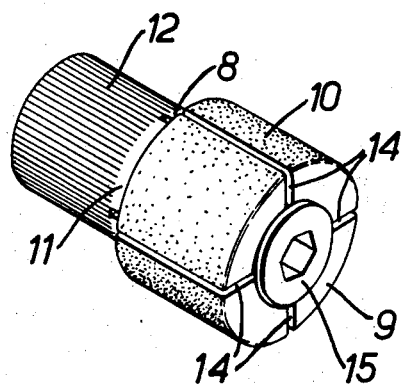
FIG. 2 is a general view of a detail of FIG. 1.

Referring to FIGS. 1 and 2 a window pivot 1 is shown having a female part 2 and a male part 3, each part having flanges 4 which allow the two parts of the pivot 1 to be attached respectively to a window frame and a window sash. The female part 2 of the pivot 1 comprises a cylindrical drum 5. The male part 3 of the pivot comprises a bush 7 fitted with a stub shaft 8 having a cylindrical bearing head 9. The parts 2 and 3 of the pivot are preferably made from a light metal alloy such as a zinc or aluminium alloy. The head 9 of the shaft 8 fits in the drum 5 of the female part 2 of the pivot. The stub shaft 8 has a body 11 with longitudinal grooves 12 which engage with complementary longitudinal grooves in the inner surface of the bush 7 when the body 11 of the stub shaft 8 is press fitted in the bush 7. The stub shaft 8 is of tubular form having a longitudinal bore 13. The head 9 of the stub shaft 8 is divided into segments by four equidistantly spaced longitudinal slots 14.

In one arrangement the head 9 of the stub shaft 8 is coated with a layer of an acetyl polymer. In this case, where the drum 5 is made of a material such as a light metal alloy which does not have the required friction characteristics with respect to the layer of plastic 10 on the head 8 of the stub shaft 9, the inner surface of the drum 5 is plated with a metal having the required friction characteristics such as chromium. Alternatively the drum 5 is fitted with an internal sleeve of a suitable metal such as brass or stainless steel. In another arrangement the inner surface 6 of the drum 5 has a lining of an acetal polymer in which case the head 9 of the stub shaft 8, again if this is of a material having unsuitable friction characteristics, is chromium plated. A more expensive alternative is to make the stub shaft of brass or stainless steel.

The end of the bore 13 in the stub shaft 8 is tapered and threaded in the head 9 to fit a tapered socket screw 15. Access to the screw 15 for adjustment purposes is through an aperture 16 in the end face of the drum 5. In operation as the screw 15 is screwed into the tapered end of the bore 13 in the stub shaft 8 the head 9 is expanded radially so that the interfacial pressure between the surface of the head 9 of the stub shaft 8 and the inner surface 6 of the drum 5 is increased. Conversely if the screw 15 is unscrewed in the bore 13 the interfacial pressure between the contacting surfaces will be reduced.

Figure 3:
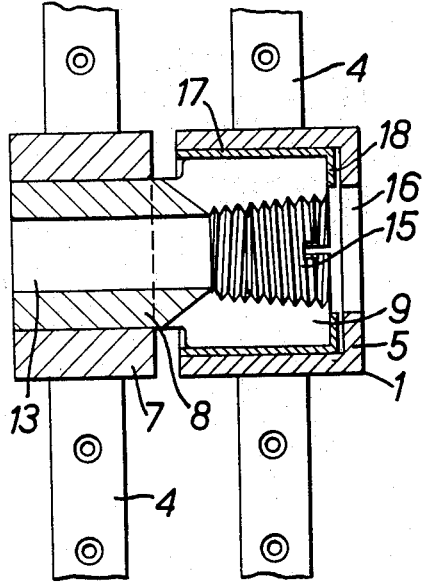
FIG. 3 is a sectional view of an alternative form of the window pivot shown in FIG. 1.

FIG. 3 shows an alternative arrangement of the window pivot 1 having a thin metal sleeve 17 located between the head 9 of the stub shaft 8 and the inner surface 6 of the drum 5. The end of the sleeve 17 adjacent the opening 16 in the drum 5 may be formed with a flange 18 to retain the sleeve 17 in its longitudinal position in the pivot 1. The sleeve 17 may be of a suitable metal such as stainless steel or brass. In this case either the surface of the head 9 of the stub shaft 8 or the inner surface 6 of the drum 5 is coated with a layer of an acetal polymer.

Alternatively the inner or outer surface of the sleeve 17 may be coated with acetyl polymer in which case the corresponding surface of the head 9 of the stub shaft 8 or the inner surface 6 of the drum 5 is chromium plated. In another modification where the outer surface of the sleeve 17 is coated with acetal polymer the inner surface 6 of the drum 5 is fitted with a sleeve of brass or stainless steel. In the case where the inner surface the sleeve 17 is coated with acetal polymer the stub shaft 8 may be made of brass or stainless steel.

Figure 4:
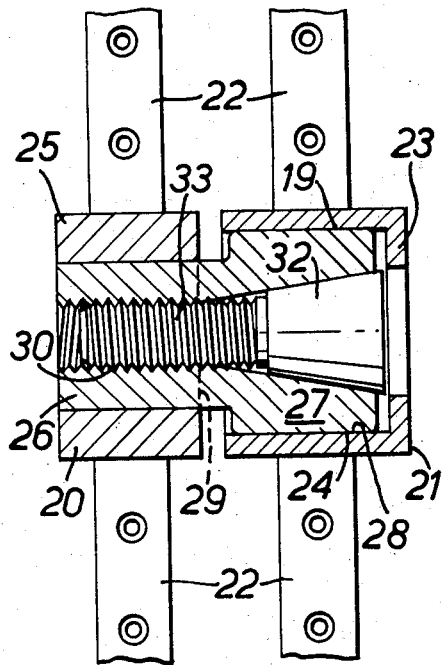
FIG. 4 is a sectional view of a second window pivot according to the invention.

FIG. 4 illustrates a window pivot 19 of similar construction to the window pivot shown in FIGS. 1 and 2. The window pivot 19 comprises a female part 20 and a male part 21, having flanges 22 which allow the parts 20 and 21 of the pivot to be attached to the window frame and window sash respectively. The female part 21 of the pivot 19 comprises a cylindrical drum 23 having an inner bearing surface 24 and the male part 20 of the pivot 19 comprises a bush 25 fitted with a stub shaft 26 fabricated from an acetal polymer. The stub shaft 26 has a cylindrical bearing head 27 with an outer bearing surface 28 and the head 27 of the stub shaft 20 fits in the drum 23 of the part 21 of the pivot 19. The stub shaft 26 has a body 29 with longitudinal grooves which engage with complementary longitudinal grooves in the inner surface of the bush 25 when the body 29 of the stub shaft 26 is press fitted in the bush 25. In the case where the drum 23 is made of a material such as a light metal alloy, having unsuitable friction characteristics with respect to the material of the stub shaft 26, the inner bearing surface 24 of the drum 23 is chromium plated or the drum 23 may be fitted with an internal sleeve of brass or stainless steel. The stub shaft 26 has a longitudinal bore 30 which is tapered from the end face of the head 27 to fit a tapered plug 32. The parallel part of the bore 30 in the stub shaft 26 is threaded to fit a threaded extension 33 of the plug 32.

In operation as the threaded extension 33 of the plug 32 is screwed into the threaded part of the bore 30 the plug 32 is moved into the tapered end of the bore 30 and expands the head 27 radially so that the interfacial pressure between the bearing surface 28 of the head 27 and the inner bearing surface 24 of the drum 23 is increased. The interfacial pressure between the bearing surfaces 28 and 24 is set so that when the window is open there is sufficient frictional resistance between the bearing surfaces 28 and 24 to retain the window in the desired position whilst at the same time allowing easy closure by hand.

Once set, the interfacial pressure, and hence the frictional resistance between the bearing surfaces 28 and 24 remains constant and is unaffected by long term creep wear or climatic changes. Operation of the pivot is smooth and silent and arising from use of the materials specified for the bearing surfaces 28 and 24 there will be no stick-slip effect.

Figure 5:
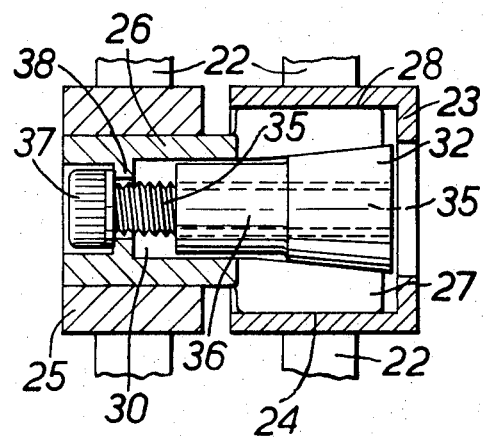
FIG. 5 is a sectional view of an alternative form of the window pivot shown in FIG. 4.

FIG. 5 shows a modification of the arrangement shown in FIG. 4 in which the tapered plug 32 has an internally threaded longitudinal bore 34. A socket screw 35 is fitted in the bore 34 at the end of a cylindrical extension 36 of the plug 32. The socket screw 35 has a head 37 which bears against an internal flange 38 in the parallel part of the bore 30 in the stub shaft 26. In operation rotation of the screw 35 to load the head 37 against the flange 38 draws the tapered plug 32 into the tapered end of the bore 30 in the stub shaft 26 so that the interfacial loading applied between the bearing surfaces 24 and 28 of the drum 23 and the head 27 of the stub shaft 26 can be adjusted to a required degree.

Figure 6:
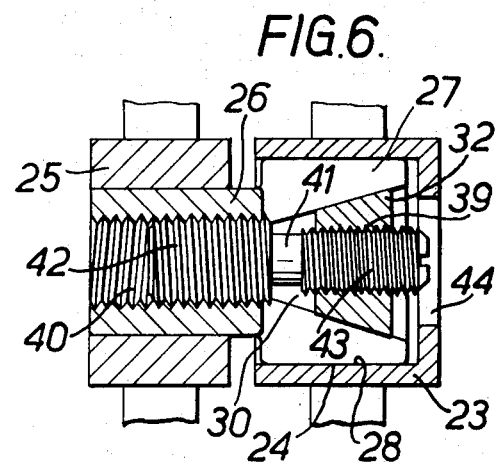
FIG. 6 is a sectional view of another alternative form of the window pivot shown in FIG. 4.

FIG. 6 shows a further modification of the arrangement shown in FIG. 4. The plug 32 moves in the tapered end of the bore 30 in the stub shaft 26. The plug 32 has a fine threaded axial bore 39 and the parallel part 40 of the bore 30 in the stub shaft 26 has a coarse internal thread. A screw 41 has a coarse threaded end 42 and a fine threaded end 43. The coarse threaded end 42 of the screw 41 operates in the coarse threaded part 40 of the bore 30 and the fine threaded end 43 of the screw 41 operates in the fine threaded bore of the tapered plug 32. The screw 41 has a slotted end which is accessible through an opening 44 in the drum 23. In operation of the arrangement of FIG. 6 the interfacial pressure between the bearing surfaces 24 and 28 of the drum 23 and the head 27 of the stub shaft 26 is adjusted by rotation of the screw 41 to move the tapered plug 32 in the tapered end of the bore 30 in the stub shaft 26.

I claim:

1. A pivot bearing assembly comprising inner and outer members having cooperating cylindrical bearing surfaces wherein the material of one of the surfaces is metallic and the material of the other surface is acetal polymer, and taper plug means for resiliently expanding the bearing surface of the inner member to apply and maintain a high interfacial pressure between the bearing surfaces, the static friction between said bearing friction surfaces being low and similar to the dynamic friction therebetween whereby, when a high interfacial pressure is maintained, operation of the pivot is smooth and quiet and free of a stick-slip effect.

2. A pivot bearing assembly according to claim 1 wherein the material of the metallic surface is selected from the group consisting of chromium, brass and stainless steel.

3. A pivot bearing assembly according to claim 1 wherein the taper plug means, being adapted for rotation by an adjusting tool, is screw threaded and in engagement with a complementary taper screw threaded socket in the inner member, the wall which bounds the taper screw threaded socket being slit to facilitate radial expansion of the bearing surface of the inner member.

4. A pivot bearing assembly according to claim 2 wherein the bearing surface of inner member is metallic.

5. A pivot bearing assembly according to claim 2 wherein the bearing surface of the outer member is metallic.

6. A pivot bearing assembly comprising inner and outer members having cooperating cylindrical bearing surfaces wherein the material of one of the surfaces is metallic and the material of the other surface is acetal polymer, a frustro-conical plug slidable within a complementrary frustro-conical bore in the inner member for radially and resiliently expanding the bearing surface of the inner member to apply and maintain a high interfacial pressure between the bearing surfaces, and screw thread means for urging the plug along the frustro-conical bore, the static friction between said bearing friction surfaces being low and similar to the dynamic friction therebetween whereby, when a high interfacial pressure is maintained, operation of the pivot is smooth and quiet and free of a stick-slip effect.

7. A pivot bearing assembly according to claim 6 wherein the wall which bounds the frustro-conical bore of the inner member is slit to facilitate radial expansion of the bearing surface of the inner member.

8. A pivot bearing assembly according to claim 6 wherein the inner member comprises acetal polymer and the inner member has a bolt comprising the frustro-conical plug and screw thread means, the bolt engaging with a complementary helical screw thread formed in an extension to the frustro-conical bore of the inner member.

9. A pivot bearing assembly according to claim 6 wherein the screw thread means is a bolt engaging with a screw thread in the frustro-conical plug and the frustro-conical bore in the inner member has an internal abutment flange for the head of the bolt.

10. A pivot bearing assembly according to claim 7 wherein the frustro-conical bore has a screw threaded extension, the screw thread means for urging the frustro-conical plug along the bore in the inner members comprises a pin having a first screw thread complementary to the screw threaded extension and a second screw thread of smaller pitch than the first screw thread, the second screw thread being engaged by a complementary screw thread in the frustro-conical plug, the pin being adapted for engagement with an adjusting tool.

* * * * *